Nov. 24, 1953  F. G. KELLY  2,660,707
LONG SCALE ELECTRICAL INSTRUMENT
Filed Feb. 5, 1949                    2 Sheets-Sheet 1
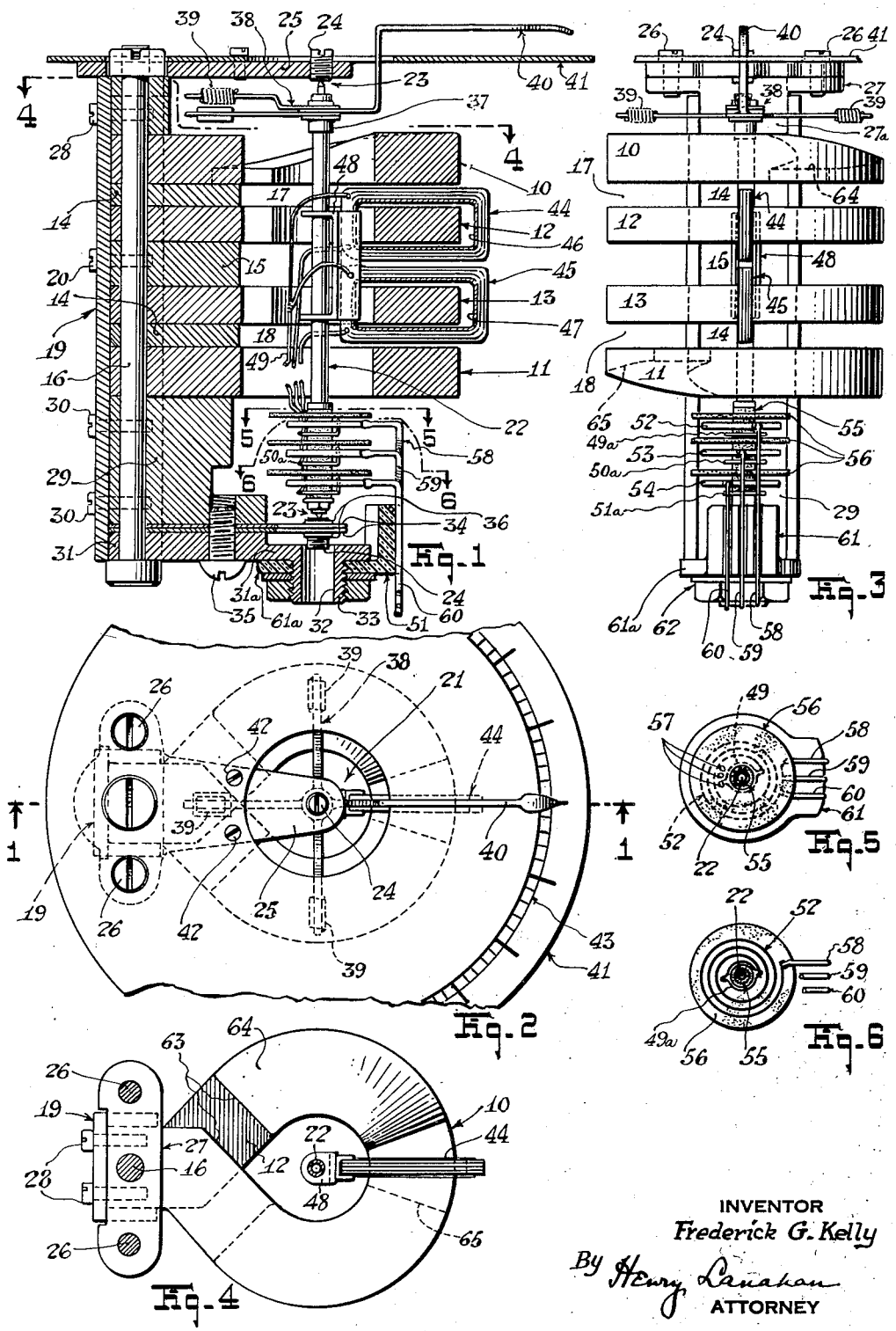
INVENTOR
Frederick G. Kelly
By Henry Lanahan
ATTORNEY

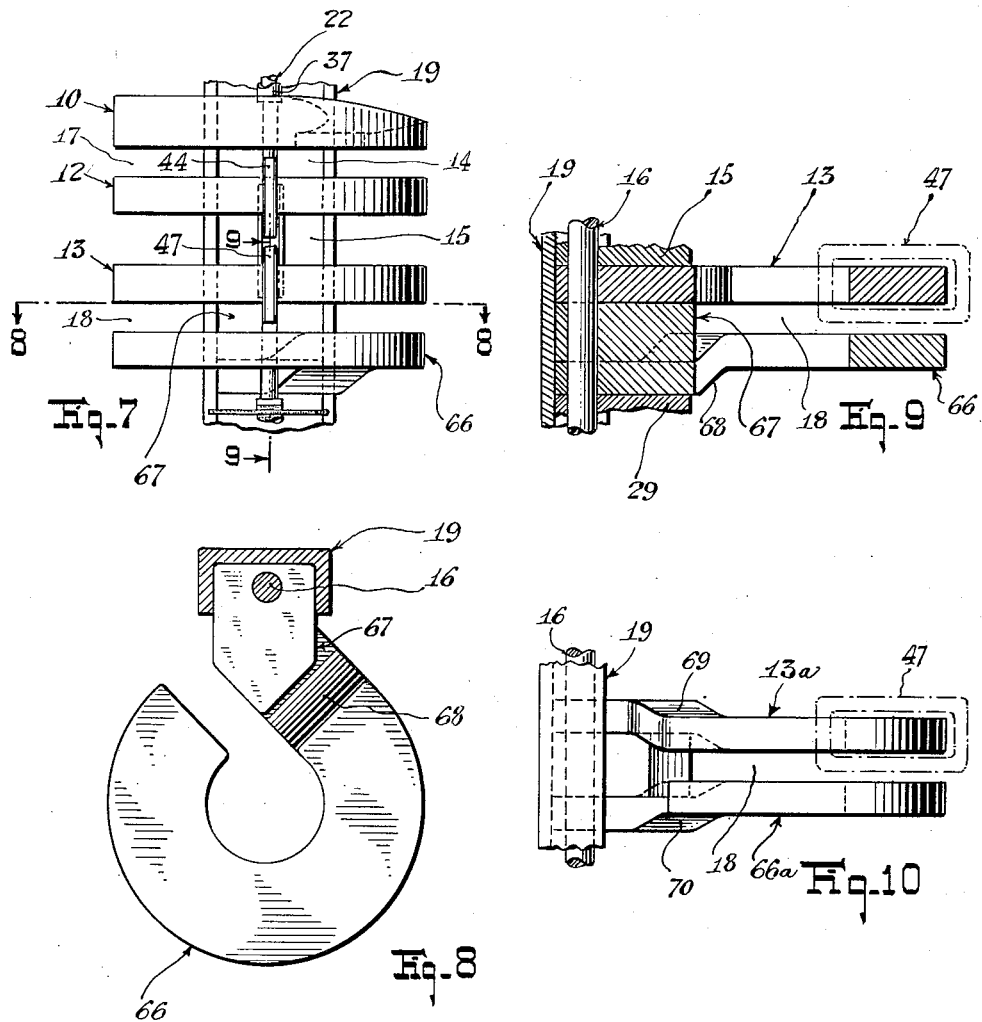

Patented Nov. 24, 1953

2,660,707

UNITED STATES PATENT OFFICE 2,660,707

LONG SCALE ELECTRICAL INSTRUMENT

Frederick G. Kelly, West Orange, N. J., assignor to Thomas A. Edison, Incorporated, West Orange, N. J., a corporation of New Jersey Application February 5, 1949, Serial No. 74,820

6 Claims. (Cl. 324—140)

This invention relates to electrical instruments and particularly to moving-coil instruments of the long-scale ratio measuring type.

Long-scale ratio measuring instruments are well known in the art but have been complicated and expensive, difficult to produce with uniform characteristics and difficult to service. By the present invention, such instruments are provided which are relatively simple and economical to manufacture, which are arranged so that critical tolerances can in practice be held to close limits to enable the instruments to be produced with uniform characteristics, and which can be easily assembled and disassembled for servicing and repair. As to this last respect, a particular feature of the invention is that the rotor can be easily installed and removed, to enable replacement of worn pivots, rotor coils, etc., without disturbing the field structure. A further feature of the invention is that it enables long-range measuring instruments to be produced having a small overall diameter.

These and other objects and features of the invention will be apparent from the following description and the appended claims, reference being had to the accompanying drawings, of which:

Figure 1 is a sectional view of an instrument according to my invention taken on the line 1—1 of Figure 2;

Figure 2 is a fractional plan view of this instrument as seen from the dial end thereof;

Figure 3 is a right-hand elevational view of the instrument as it appears in Figure 1;

Figure 4 is a fractional section taken on the line 4—4 of Figure 1;

Figures 5 and 6 are fractional sections taken on the lines 5—5 and 6—6 respectively of Figure 1;

Figure 7 is a fractional elevational view, similar to Figure 3, showing a modified form of instrument according to my invention;

Figure 8 is a fractional section on the line 8—8 of Figure 7;

Figure 9 is a fractional section on the line 9—9 of Figure 7; and

Figure 10 is a fractional elevational view of the lower one-half portion of the field structure according to a second modification of my invention.

The illustrative embodiment of my invention shown in the accompanying figures comprises a permanent-magnet field structure including two arcuately-shaped permanent magnets 10 and 11 mounted on a common axis which is the pivot axis of the rotor of the instrument as will appear. The magnets are preferably placed at the opposite ends of this field structure, and two similarly-shaped non-permanent pole members 12 and 13 are interposed between them in coaxial arrangement therewith. In the present instrument the magnets may be made of the relatively cheap machinable materials such as tungsten magnet steel (5% tungsten, 1% carbon, 94% iron), chromium magnet steel (3½% tungsten, .9% carbon, 95.6% iron) or of a relatively cheap sintered alloy known commercially as Indalloy (17% molybdenum, 12% cobalt and 71% iron). The pole members are made of soft iron or of materials having similar magnetic properties, the term "soft iron" being herein employed to refer to any such suitable materials. Each magnet pole member has a radially-extending base portion at one end. Preferably, these base portions are aligned in parallel relation with the common axis of the field structure. Spacers 14 of soft iron are interposed between the base portions of each magnet and the respectively cooperating pole member, and a thicker spacer 15 is interposed between the two pole members. Passing through the base portions of the magnets, pole members and spacers is a bolt 16 which clamps the parts in stacked relation and holds them into a unitary structure.

The magnets and their cooperating pole members have confronting faces separated by air gaps through which flows the useful flux of the instrument, there being such a gap 17 between the magnet 10 and pole member 12 and a gap 18 between the magnet 11 and pole member 13. A feature of the present instrument is that these air gaps can be made uniform and to very close tolerances since they appear between planar confronting faces which can be ground flat to any desired degree of precision. In the same respect, the magnets and pole members can be held in true parallel relation by grinding the opposite faces of the spacers 14 flat and parallel.

The magnets are magnetized to have a varying magnetomotive force along their arcuate length and to provide thus a varying magnetomotive force across the air gaps along the lengths of the latter. Thus, the flux density of the gaps is a minimum at the spacers 14 and a maximum at the free ends of the magnets. The magnetizing of each magnet is carried out after it has been permanently assembled with its cooperating pole member by filling the slot between the base and free ends of the magnet—which is, for instance, the slot 63 of the magnet 10—with a soft iron piece to complete a ring, then inserting a conductive bar through the ring and feeding a current impulse of the order of 20,000 amperes through the bar. Next, the soft iron piece is removed, and an alternating current is fed through the bar to reduce the magnetization of the magnet by about 10% for stabilizing purposes.

Preferably, the magnets and pole members are rectangular in cross section; however, the magnets are typically made thicker than the pole members since the latter will usually carry flux at higher density. For a long-scale instrument having a scale length of 270° the arcuate length of each magnet and pole member from the medial line of its radially-extending base portion to its free end is typically of the order of 315°.

In order to hold the magnets and pole members in true coaxial relationship, the radially-extending base portions thereof are shaped uniformly and formed with flat parallel sides, and a channel bar 19 is fitted thereon along the length of the field structure. This bar is held in place, for example, by screws 20 which thread into the intermediate spacer 15.

A rotor 21 for the instrument comprises a shaft 22 having pivots 23 at its ends which engage V-jewel bearings mounted in screws 24—hereinafter referred to as jewel screws—to pivotally support the shaft at the central axis of the field structure. The upper jewel screw 24 is threaded into an arm 25 having side wings in its base held by screws 26 to like side wings of a pedestal 27. This pedestal has a block-shaped base 27a clamped to the base portion of the magnet 10 by the bolt 16. Embracing this block is an end portion of the channel bar 19, the base being secured to the channel bar by two screws 28. At the other end of the instrument there is a block 29 also embraced by the channel bar 19 and clamped against the base portion of the lower magnet 11 by the bolt 16, the block 29 being secured to the channel bar by screws 30. Clamped by the bolt 16 against the lower face of the block 29 is a member 31 having a downwardly offset arm 31a terminating at the central axis of the instrument and provided with an aperture 32. This aperture is surrounded by a depending threaded flange 33 for receiving parts hereinafter described. Clamped between the member 31 and the block 29 are two blades 34 which are held in place by the bolt 16 and by a screw 35 that passes through the member 21 and is threaded into the block 29. The free end portions of the two blades have openings aligned with the central axis of the field structure. These openings are surrounded by flanges 36 struck from the blades, the flange on the upper blade being extended upwardly and that on the lower blade downwardly. These flanged openings are threaded to receive the lower jewel screw 24. The free end portions of the blades are biased apart, but are held together as the jewel screw is threaded therethrough, so that upon their release they will exert pressure on the threads of the jewel screw to hold the same in its adjusted position.

On the upper end of the shaft 22 there is a flanged collar 37 to which there is staked a cross 38 having three equilength arms at 90° intervals on which are mounted the respective balancing weights 39. This cross has a fourth and longer arm 40, at a further 90° interval, the major portion of which is offset beyond the upper jewel screw 24 to constitute an indicating pointer. This pointer overlies an annular dial 41 that is held onto the upper arm 25 by two screws 42. On this dial there is a graduated arcuate scale 43 with which the pointer 40 registers to indicate the measurements of the instrument.

The rotor 21 includes two coils 44 and 45, one of which embraces the pole member 12 and the other the pole member 13. These coils are wound on respective channel frames 46 and 47, made as of aluminum or copper. These frames 46 and 47 are secured to a bail 48 which in turn is mounted on the central portion of the shaft 22. The frames 46 and 47 constitute shorted turns on the pole members which, as they cut the flux in the air gaps when the rotor is moved, cause opposing electromagnetic forces to be set up which damp the movement of the rotor, as is well understood in the art.

Two lead wires of the rotor coils are joined together to form a common lead 49. This common lead and the remaining lead wires 50 and 51 of the coils (Figure 1) are connected to respective metal disks 49a, 50a and 51a. To these metal disks are connected the inner ends of respective current-conductive hair springs 52, 53 and 54. These are very light springs arranged to impose a minimum torque on the rotor. The disks 49a–51a are mounted on an insulating sleeve 55 provided on the lower portion of the shaft 22. On this sleeve above each hair spring there is an insulating disk 56 which serves as a protective guard for the respective spring. These disks have openings 57 for the lead wires 49–51 (Figure 5), there being three such openings in the top disk, two in the next lower disk and one in the bottom disk. The outer ends of the hair springs are connected to respective pins 58–60 which are carried by an insulating block 61. This block has a right-angle apertured extension 61a secured to the threaded flange 33 by a nut and washer generally referred to as 62.

In a ratiometer the torque acting on at least one of the rotor coils must vary with the deflection. Preferably, as in the present instrument, the torque on each of the coils is varied. These torques must oppose each other. This is accomplished in the present instrument by reversing the direction of the lower magnet 11 relative to that of the other magnet 10. Notwithstanding the necessity of having one portion of the field structure so reversed, this structure is arranged according to my invention to permit easy installation and removal of the rotor. This is made possible by aligning the slots, which are between the base and free end portions of each pole member 12 and 13, and the corresponding slot 63 of the magnet 10 (Figure 4), in parallel relation with the central axis of the field structure. This requires of course that the pole member 13 be reversed with respect to its cooperating magnet 11, but such reversal is permitted since the magnetomotive force at all points of the pole member is substantially constant. When the slots of both pole members and one of the magnets are so aligned, the rotor can be installed and removed without disturbing the field structure, provided of course that the rotor coils are not displaced axially about the rotor axis by more than the angle subtended at the axis of the field structure by the slots. (Preferably, the coils are mounted coplanar, and the slots are made to subtend an angle of at least 30° to about 45°.) To assemble the rotor, for example, the coils are dropped into the slots and the bottom pivot is set into the lower jewel screw 24; next the rotor is turned to thread the rotor coils onto the respective pole members and the upper jewel screw is mounted into engagement with the top pivot. This ease with which the rotor can be installed, and likewise removed, is important not only in reducing the cost of manufacture of the instrument but also in that it facilitates servicing of the instrument such, for example, as the replacing of worn pivots, the installation of new rotor coils, etc., all of which can be done without disassembling any part of the field structure or making any change therein that might affect the calibration of the instrument.

The torque acting on each armature coil, for a given current in the coil, is dependent on the change of flux linkage with the coil caused by an incremental deflection of the coil. The flux density in the air gap 17 is a minimum at the clockwise end of the gap and increases to a maximum as one proceeds counterclockwise about the pivot axis to the free end of the magnet 10 (Figure 4); on the other hand, the flux density in the air gap 18 is a minimum at the counterclockwise end thereof and increases to a maximum as one proceeds clockwise along the gap to the free end of the magnet 11. It is desirable that the torque-deflection characteristic for each coil be substantially linear or, from another viewpoint, that the flux density in the air gaps vary uniformly along the lengths of the gaps since then a more uniform calibration of the instruments can be obtained in production. In the present instrument, such varying field density is obtained by providing uniform air gaps between each magnet and cooperating pole piece, as heretofore described, and by varying uniformly the magnetomotive force along the magnet—i. e., providing magnets having uniform magnetizing force. To obtain a uniform magnetomotive force gradient each magnet should have a uniform composition and be properly shaped. Typically, commercial permanent-magnet materials of the types mentioned have sufficiently uniform composition. The shaping is preferably such that at each cross section of the magnet there is a substantially uniform magnetic induction—i. e., flux density. Insofar as the gap flux is concerned, this requires that the thickness dimension of each magnet be varied by a square law from a maximum value at its base end to a minimum value at its free end. However, in view of the linkage flux being mostly at the free end portion of the magnet, a linear tapering of only the free end portions of the magnets, as at 64 and 65 respectively, will cause the magnetic induction to be nearly constant throughout the lengths of the magnets, and will cause a substantially uniformly varying magnetomotive force to be produced across the air gaps along the lengths thereof. The tapering of the magnets is however not critical. For instance, when the magnets are sintered, the tapering is formed by the sintering operation without any further finishing being required.

Prime advantages of the present instrument, which are apparent from the foregoing description, lie in the simplicity of its parts, the economy of their manufacture, the ease of assembling them into the finished instrument, and the ease of removing the rotor for replacing pivots, coils, etc., without disturbing the field structure. It is to be noted particularly that the provision of air gaps between planar parallel surfaces of a magnet and its pole member not only cheapens the construction but also enables the instrument to be produced more uniformly and accurately. The use of effectively long magnets permits cheaper and more easily fabricated magnet materials to be employed. By arranging the magnets and pole members coaxially the diameter of the instrument is kept small.

While the foregoing features are particularly beneficial and unusual in a long-scale ratio measuring instrument, it will be apparent from the foregoing description that these features are not limited either to long-scale instruments or to those of the ratio type.

In the modified embodiment shown in Figures 7 to 9, the lower element of the permanent-magnet field structure, formerly the magnet 11, is replaced by a soft iron arcuate pole member 66 and the lower spacer, formerly the soft iron spacer 14, is replaced by a block-shaped permanent magnet 67. The pole member 66 has a radially-extending base portion traversed by the bolt 16 and embraced by the channel bar 19 to hold it permanently in the field structure in coaxial arrangement with the other elements thereof, the same as was the magnet 11 in the former embodiment. The pole member may extend in either direction from its base, it being shown as extending clockwise by way of example. The magnet 67 is magnetized in the direction of the clamping bolt 16 and is preferably made of one of the available aluminum-nickel-cobalt-iron alloys, say that known commercially as "Alnico IV" having a composition of 12% aluminum, 28% nickel, 5% cobalt and the remainder iron. For efficient design, such a magnet should have about twice the length of the former spacer 14, as is shown in the figures. It is undesirable, however, to increase the air gap between the pole member 66 and the adjacent pole member 13, and therefore the pole member 66 is provided with an offset 68 at the magnet 67, the offset being between the magnet and a plane through the end face of the adjacent pole member 13 parallel to the axis of the instrument, as shown in the figures, it being understood that the remaining portion of the pole member 66 is flat and coplanar with the adjacent face of the pole member 13 to provide the uniform air gap 18 therebetween. The feature of shaping cooperating pole members so that the length of air gap therebetween is less than the length of a block-shaped permanent magnet interposed between the pole members is disclosed and claimed in my co-pending application Serial No. 299,133 filed July 16, 1952.

In this modified embodiment, a magnetic flux is produced in the air gap 18 by the magnet 67. However, the magnetomotive force at all points on the soft iron pole members 13 and 66 is substantially constant, and since the air gap 18 is uniform, it follows that the flux density in this air gap is substantially uniform. The change in flux linkage with the coil 47 on the pole member 13, for each incremental deflection of the rotor, is therefore constant with the result that a constant torque is exerted on the coil 47 at all positions thereof. This torque is made to oppose the variable torque exerted on the other coil 44, as by properly selecting the directions of magnetization of the magnet 67 and of the current in the coil 47, so that a true ratiometer action is obtained.

In the further embodiment shown in Figure 10, the pole member 13, now referred to as 13a, is offset downwardly at 69 and the pole member 66, now referred to as 66a, is offset upwardly at 70, but each offset is one-half the amount of the offset 68 in the former embodiment. In this embodiment, the pole members 13a and 66a may be identical in shape since one may be mounted in reverse direction to that of the other, as shown, to cause the end portions thereof to be spaced more apart by the respective offsets 69 and 70 abovementioned. By offsetting the end portion of each of the pole members 13a and 66a, the shunting effect of the adjacent portions of the pole members on the magnet is reduced; however, in all essential respects it will be observed that this modified structure is equivalent in its operation to that of the embodiment just described.

The embodiments herein particularly described, which are intended to be illustrative and not limitative of the invention, are subject to changes and modifications without departure from the scope of the invention, which I endeavor to express according to the following claims.

I claim:

1. An electrical instrument comprising an arcuately-shaped permanent magnet member less than 360° in length, an arcuately-shaped soft iron pole member spaced axially from said magnet on a common axis therewith to provide a uniform air gap therebetween, a magnetic spacing member between one end of said magnet member and an end of said pole member, said magnet member having opposite poles at its ends and being magnetized substantially uniformly along the length thereof to provide a magnetomotive force across said gap which varies uniformly along the gap, and a movable rotor coil embracing said pole member and pivoted at said axis of said magnet.

2. An electrical instrument comprising an arcuately-shaped permanent magnet magnetized along the length thereof to have opposite poles at its ends, an arcuately-shaped soft iron pole member mounted in coaxial relation with said magnet and spaced along their common axis from each other, one end portion of said pole member being joined to an end portion of said magnet, said magnet and pole member having confronting parallel faces uniformly spaced in the direction of said axis from each other along their remaining portions, said magnet having the free end portion thereof tapered in its thickness dimension to cause the flux density in the magnet to be substantially constant throughout the length of the magnet, and a rotor coil pivoted at the axis of said magnet and pole member and embracing said pole member.

3. An electrical ratio instrument comprising two arcuately-shaped permanent magnets coaxially arranged, two arcuately-shaped soft iron pole members interposed between said magnets in coaxial arrangement therewith, the end portions of said magnets and pole members being aligned substantially in parallel with the axis of the magnets, spacers between said end portions, means clamping said end portions and spacers together in stacked relation, each of said magnets and its adjacent pole member having confronting parallel faces providing a uniform air gap therebetween, said magnets being magnetized along their lengths to provide a magnetomotive force along said gaps which varies along the lengths thereof, and a rotor pivoted at said axis and comprising a pair of coils offset along said axis and embracing said respective pole members.

4. An electrical ratio instrument comprising two arcuately-shaped permanent magnets on a common axis, two arcuately-shaped soft iron pole members interposed between said magnets in coaxial arrangement therewith, an end portion of each of said magnets being aligned with a portion of the respectively adjacent pole member and being magnetically joined thereto, and the remaining portions of each of said magnets and respective pole members being uniformly spaced from each other to provide uniform air gaps therebetween, and a rotor pivoted at said axis and comprising two coils offset along said axis and embracing said pole members respectively, said magnets having a substantially uniform magnetizing force along their lengths to provide a flux in said gaps the density of which varies substantially uniformly along the gaps, and the arrangement of said magnets and respective pole members being such that one of said coils moves into an increasing magnetic field and the other moves into a decreasing magnetic field upon deflection of said rotor.

5. An electrical ratio instrument comprising two arcuately-shaped magnets coaxially arranged, the end portions of said magnets being aligned along the common axis of the magnets and said magnets extending in reverse directions from their said end portions relative to said axis, two arcuately-shaped soft iron pole members interposed between said magnets and having end portions thereof aligned with said end portions of the magnets, said pole members being arranged coaxially with said magnets and both being extended in the same direction from their said end portions whereby the slots between the ends of said pole members and that between the ends of one of said magnets are aligned along said axis, magnetic spacing means joining said end portion of each of said magnets to the said end portion of the respectively adjacent pole member, means holding the magnets and respective pole members in spaced relation to provide uniform air gaps therebetween, said magnets being magnetized along their lengths to provide a magnetomotive force across said gaps which varies along the gaps, and a rotor pivoted at said axis and comprising two coils embracing said pole members respectively, both of which are at the same side of said rotor axis.

6. In an electrical ratio instrument: the combination of two arcuately-shaped magnet members coaxially arranged and having end portions thereof aligned along their common axis, one of said magnet members extending in the reverse direction from the other relative to said axis, two arcuately-shaped soft iron pole members in coaxial arrangement with said magnet members, one of which cooperates with one of said magnet members to form one field structure and the other with the other of the magnet members to form a second field structure, each magnet member and its cooperating pole member being uniformly spaced along said axis to provide a uniform air gap therebetween and being magnetically joined together at one end of said gap, both of said pole members extending in the same direction relative to said axis from the ends at which they are joined to the respective magnet members whereby the slots which are between the ends of each of the pole members are aligned along said axis with the slot which is between the ends of one of the magnet members, and a rotor pivoted at said axis and comprising two coils, one of said coils embracing one of the members of one of said field structures and the other of said coils embracing one of the members of the other of said field structures.

FREDERICK G. KELLY.

References Cited in the file of this patent

UNITED STATES PATENTS

| Number | Name | Date |
|---|---|---|
| 1,633,912 | Vawter | June 28, 1927 |
| 1,847,936 | Faus | Mar. 1, 1932 |
| 1,918,023 | Faus | July 11, 1933 |
| 2,428,209 | Fleming | Sept. 30, 1947 |
| 2,440,535 | Baranowski | Apr. 27, 1948 |
| 2,457,685 | Klepp | Dec. 28, 1948 |

FOREIGN PATENTS

| Number | Country | Date |
|---|---|---|
| 34,629 | Switzerland | Aug. 19, 1905 |
| 16,112 | Great Britain | Nov. 15, 1915 |
| 441,908 | Great Britain | Jan. 29, 1936 |
| 474,887 | Great Britain | Nov. 9, 1937 |